United States Patent
Zhou et al.

(10) Patent No.: US 11,942,646 B1
(45) Date of Patent: Mar. 26, 2024

(54) END COVER ASSEMBLY, ENERGY-STORAGE APPARATUS, AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/393,043

(22) Filed: Dec. 21, 2023

(30) Foreign Application Priority Data

Feb. 9, 2023 (CN) .......................... 202310091062.7

(51) Int. Cl.
 *H01M 50/15* (2021.01)
 *H01M 50/131* (2021.01)
 (Continued)

(52) U.S. Cl.
 CPC ......... *H01M 50/15* (2021.01); *H01M 50/131* (2021.01); *H01M 50/143* (2021.01);
 (Continued)

(58) Field of Classification Search
 CPC .. H01M 50/15; H01M 50/143; H01M 50/131; H01M 50/176; H01M 50/627; H01M 50/317
 See application file for complete search history.

(56) References Cited

FOREIGN PATENT DOCUMENTS

| CN | 206349416 U | 7/2017 |
|----|-------------|--------|
| CN | 206541867 U | 10/2017 |

(Continued)

OTHER PUBLICATIONS

CNIPA, Notice of Allowance for corresponding Chinese Patent Application No. 202310091062.7, dated Apr. 27, 2023, 8 pages.

(Continued)

*Primary Examiner* — Jimmy Vo
(74) *Attorney, Agent, or Firm* — IP Spring

(57) ABSTRACT

An end cover assembly, an energy-storage apparatus, and an electricity-consumption device are provided. The end cover assembly includes an end cover, an insulating member, a positive pole, a negative pole, a first connecting member, and a second connecting member. The insulating member and the end cover are stacked in a first direction. The insulating member includes a first separate member, a second separate member, a third separate member, and a fourth separate member. The third separate member, the first separate member, and the second separate member cooperatively define a first accommodating space. The fourth separate member, the first separate member, and the second separate member cooperatively define a second accommodating space. The positive pole penetrates through the third separate member and the end cover. The negative pole penetrates through the fourth separate member and the end cover.

20 Claims, 9 Drawing Sheets

(51) Int. Cl.
*H01M 50/143* (2021.01)
*H01M 50/176* (2021.01)
*H01M 50/317* (2021.01)
*H01M 50/627* (2021.01)

(52) U.S. Cl.
CPC ....... *H01M 50/176* (2021.01); *H01M 50/317* (2021.01); *H01M 50/627* (2021.01)

(56) References Cited

FOREIGN PATENT DOCUMENTS

| | | |
|---|---|---|
| CN | 108428826 A | 8/2018 |
| CN | 212874611 U | 4/2021 |
| CN | 113794036 A | 12/2021 |
| CN | 218414679 U | 1/2023 |
| CN | 218414936 U | 1/2023 |
| JP | 2017157342 A | 9/2017 |
| WO | 2017148609 A1 | 9/2017 |

OTHER PUBLICATIONS

WIPO, International Search Report and Written Opinion for International Patent Application No. PCT/CN2023/075282, dated Jul. 24, 2023, 14 pages.

END COVER ASSEMBLY, ENERGY-STORAGE APPARATUS, AND ELECTRICITY-CONSUMPTION DEVICE

CROSS-REFERENCE TO RELATED APPLICATIONS

This application claims priority under 35 U.S.C. § 119(a) to Chinese Patent Application No. 202310091062.7, filed Feb. 9, 2023, the entire disclosure of which is incorporated herein by reference.

TECHNICAL FIELD

This disclosure relates to the field of battery technology, and in particular to an end cover assembly, an energy-storage apparatus, and an electricity-consumption device.

BACKGROUND

In recent years, new energy vehicle industries have been given unprecedented development opportunities, and an important factor affecting indexes such as use performance and endurance capability of a new energy vehicle is use performance and reliability of an energy-storage apparatus. Main components of the energy-storage apparatus include an end cover assembly, a cell, and the like.

An insulating member in the end cover assembly generally has an integrated structure. During assembly, an adapter sheet needs to be mounted on the insulating member by means of welding.

SUMMARY

In a first aspect, an end cover assembly for an energy-storage apparatus is provided in the present disclosure. The end cover assembly includes an end cover, an insulating member, a positive pole, a negative pole, a first connecting member, a second connecting member, an explosion-proof valve, and an explosion-proof-valve support.

The insulating member and the end cover are stacked in a first direction. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member. The fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction. The third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

The accommodating portion of the first separate member and the accommodating portion of the second separate member define a first gap in communication with the gas chamber in the second direction. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between the surface of the end cover facing the insulating member and a surface of each raised edge away from the end cover is a second height. The first height is less than the second height. A second gap is defined between each raised edge and a corresponding accommodating portion. The second gap is in communication with the gas chamber.

In a second aspect, an energy-storage apparatus is further provided in embodiments of the present disclosure. The energy-storage apparatus includes an end cover assembly and an electrode assembly. The end cover assembly includes an end cover, an insulating member, a positive pole, a negative pole, a first connecting member, a second connecting member, an explosion-proof valve, and an explosion-proof-valve support. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member. The fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction. The third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

The accommodating portion of the first separate member and the accommodating portion of the second separate member define a first gap in communication with the gas chamber in the second direction. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between a surface of each raised edge away from the end cover and the surface of the end cover facing the insulating member is a second height. The first height is less than the second height. A second gap is defined between each raised edge and a corresponding accommodating portion. The second gap is in communication with the gas chamber.

The electrode assembly includes a first electrode-tab and a second electrode-tab. The first electrode-tab partially accommodated in the first accommodating space of the end cover assembly and is connected to the first connecting member of the end cover assembly. The second electrode-tab is partially accommodated in the second accommodating space of the end cover assembly and is connected to the second connecting member of the end cover assembly.

In a third aspect, an electricity-consumption device is further provided in embodiments of the present disclosure. The electricity-consumption device includes an energy-storage apparatus. The energy-storage apparatus includes an end cover assembly and an electrode assembly. The end cover assembly includes an end cover, an insulating member, a positive pole, a negative pole, a first connecting member, a second connecting member, an explosion-proof valve, and an explosion-proof-valve support. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member, the fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction. The third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

The accommodating portion of the first separate member and the accommodating portion of the second separate member define a first gap in communication with the gas chamber in the second direction. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between a surface of each raised edge away from the end cover and the surface of the end cover facing the insulating member is a second height. The first height is less than the second height. A second gap is defined between each raised edge and a corresponding accommodating portion. The second gap is in communication with the gas chamber.

The electrode assembly includes a first electrode-tab and a second electrode-tab. The first electrode-tab partially accommodated in the first accommodating space of the end cover assembly and is connected to the first connecting member of the end cover assembly. The second electrode-tab is partially accommodated in the second accommodating space of the end cover assembly and is connected to the second connecting member of the end cover assembly.

BRIEF DESCRIPTION OF THE DRAWINGS

To describe the technical solutions in embodiments of the present disclosure or in the related art more clearly, the following briefly introduces the accompanying drawings for describing embodiments or the related art. The accompanying drawings in the following description show merely some embodiments of the present disclosure, and other accompanying drawings may also be obtained according to these accompanying drawings.

DETAILED DESCRIPTION

Figure 1:
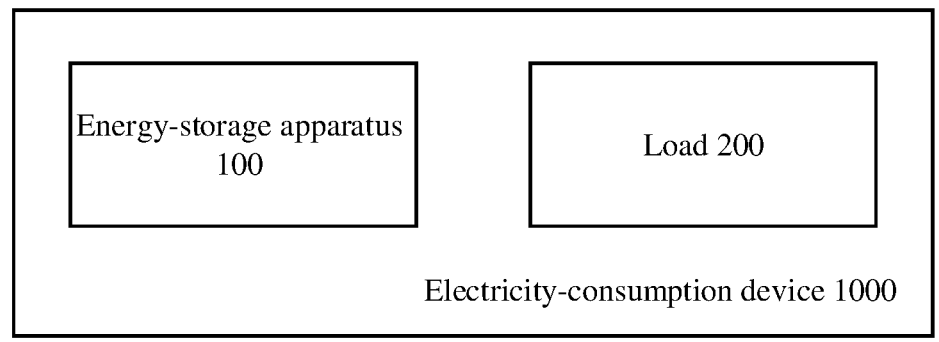
FIG. 1 is a structural block diagram of an electricity-consumption device according to an implementation of the present disclosure.

The technical solutions in embodiments of the present disclosure will be clearly described below in conjunction with the accompanying drawings in the embodiments of the present disclosure. The described embodiments are merely some of, rather than all, the embodiments of the present disclosure. Other embodiments obtained by those of ordinary skill in the art based on the embodiments of the present disclosure shall fall within the scope of protection of the present disclosure.

Due to a manufacturing process, the thickness of the insulating member of the integrated structure may be uneven, so that the strength of the insulating member is not high, thereby affecting the reliability of the end cover assembly.

To solve the foregoing problems, an end cover assembly, an energy-storage apparatus, and an electricity-consumption device that are capable of improving reliability are provided in the present disclosure.

In a first aspect, an end cover assembly for an energy-storage apparatus is provided in the present disclosure. The end cover assembly includes an end cover, an insulating member, a positive pole, a negative pole, a first connecting member, a second connecting member, an explosion-proof valve, and an explosion-proof-valve support.

The insulating member and the end cover are stacked in a first direction. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member. The fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction, and the third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

The accommodating portion of the first separate member and the accommodating portion of the second separate member define a first gap in communication with the gas chamber in the second direction. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between a surface of each raised edge away from the end cover and the surface of the end cover facing the insulating member is a second height. The first height is less than the second height. A second gap is defined between each raised edge and a corresponding accommodating portion. The second gap is in communication with the gas chamber.

In the present disclosure, compared with the integrated insulating member, the separated insulating member has a lower manufacturing difficulty, the thickness of the first separate member, the thickness of the second separate member, the thickness of the third separate member, and the thickness of the fourth separate member in the first direction can be larger, and the thickness of each part can be more uniform, so that the strength of the insulating member can be enhanced, and the reliability of the end cover assembly can be improved.

In addition, the explosion-proof-valve support is a metal member, the structural strength of the metal member is stronger than the structural strength of a plastic piece, so that a false trigger caused by a direct impact of an electrolyte flowing upwards on the explosion-proof-valve support is prevented when the energy-storage apparatus falls, thereby improving the safety and reliability of the energy-storage apparatus having the end cover assembly.

Also, the first height is less than the second height, so that the second gap is defined between each raised edge and the corresponding accommodating portion. The second gap can extend to the explosion-proof-valve support and be in communication with the gas chamber, thereby increasing the number of inlet airways of energy-storage apparatus that can enter the gas chamber.

Even more, the second gap can extend to the explosion-proof-valve support and be in communication with the gas chamber, so that a distance of the broken tab extending into the explosion-proof-valve support is lengthened. Furthermore, the drifting electrode tab mostly gets stuck at a bending position of a curved channel, and is difficult to abut against the explosion-proof-valve support made of metal after being bent twice, so that the probability that electrode-tab fragments are lap-jointed with the explosion-proof-valve support is greatly reduced, the risk of thermal runaway of the energy-storage apparatus is reduced, and the safety and reliability of the energy-storage apparatus are improved.

With reference to the first aspect, in a possible implementation of the present disclosure, the accommodating portion includes an accommodating bottom wall and an accommodating side wall fixedly connected to the accommodating bottom wall. The accommodating bottom wall and the accommodating side wall cooperatively define an accommodating space. The accommodating bottom wall defines multiple vent through-holes. The explosion-proof-valve support is accommodated in the accommodating space of the first separate member and the accommodating space of the second separate member.

The vent through-holes are used to circulate air. When the internal pressure of the electrode assembly of the energy-storage apparatus is excessive, the pressure can be relived through the vent through-holes.

With reference to the first aspect, in a possible implementation of the present disclosure, the first separate member and the second separate member each further include a buckle. The buckle is in the accommodating space. The buckle is snap-fitted into the explosion-proof-valve support.

The buckle is configured to limit a position of the first separate member with respect to the explosion-proof-valve support and a position of the second separate member with respect to the explosion-proof-valve support, so as to prevent each of middle part of the first separate member in a long strip shape and middle part of the second separate member in a long strip shape from being bent and broken downwards under the action of gravity.

With reference to the first aspect, in a possible implementation of the present disclosure, the multiple vent through-holes are arranged in the third direction, and an orthographic projection of the buckle on a plane where the accommodating bottom wall is located is located is in a region where an outermost vent through-hole in the multiple vent through-holes which is close to the accommodating side wall is located.

During assembly, with the aid of the vent through-hole corresponding to the buckle, it is convenient for an operator to align and insert the buckle into the explosion-proof-valve support and to observe whether the buckle is mounted in place.

With reference to the first aspect, in a possible implementation of the present disclosure, the multiple vent through-holes are arranged in the third direction, and a first indentation that is recessed is defined at a side wall of an outermost vent through-hole in the multiple vent through-holes which is close to the accommodating side wall. The explosion-proof-valve support includes a support body and a bending portion. The bending portion protrudes from the support body at one side of the support body facing the end cover. The buckle is snap-fitted into the bending portion. A second indentation is defined at an edge of the support body close to the bending portion. The first indentation is in communication with the second indentation in the first direction.

The energy-storage apparatus may shake during transportation or use. The electrolyte in the electrode assembly may flow to an upper surface of the support body facing the end cover. The electrolyte flowing to the support body may flow back along a flow channel defined by the second indentation and the first indentation to a middle region of the electrode assembly where the electrolyte is consumed faster, to perform re-fluid infusion. The gas produced by the electrode assembly may also flow rapidly through the first indentation and second indentation and be collected to the gas chamber under the explosion-proof valve.

With reference to the first aspect, in a possible implementation of the present disclosure, the accommodating portion has a guide slope inclined with respect to the third direction at one side of the accommodating portion away from the accommodating space.

The gas generated by the electrode assembly can enter the accommodating space along the guide slope via a surface of the accommodating portion away from the accommodating space, so that the number of airflow channels from the electrode assembly to the gas chamber is increased, and the safety of the energy-storage apparatus is further improved.

With reference to the first aspect, in a possible implementation of the present disclosure, the first separate member defines a notch on a surface of the first separate member close to the end cover. The second separate member defines a notch on a surface of the second separate member close to the end cover. Each notch is in communication with the accommodating space in the second direction.

The notch may be defined at a side portion of the insulating member, so that an airway to the accommodating space can be defined at the side portion of the insulating member, the number of airflow channels from the electrode assembly to the gas chamber is increased, and the safety of the energy-storage apparatus is further improved.

With reference to the first aspect, in a possible implementation of the present disclosure, the first separate member and the second separate member each further include a substrate, a first hook, and a second hook. The accommodating portion, the first hook, and the second hook all protrude from one side of the substrate facing the third separate member. The third separate member defines a first slot at one end of the third separate member away from the fourth separate member. The first hook is snap-fitted into the first slot. The fourth separate member defines a second slot at one end of the fourth separate member away from the third separate member defines a second slot. The second hook is snap-fitted into the second slot.

The first separate member is connected to the third separate member by means of snap-in connection. The first separate member is connected to the fourth separate member by means of snap-in connection. The second separate member is connected to the fourth separate member by means of snap-in connection. Therefore, the connection reliability is improved, and the assembly and disassembly of the end cover assembly are facilitated.

With reference to the first aspect, in a possible implementation of the present disclosure, the third separator member defines a liquid-injection through-hole close to the raised edge of the third separator member. The raised edge of the third separate member defines a communicating gas port in communication with the liquid-injection through-hole.

The raised edge of the third separator member defines a communicating gas port in communication with the liquid-injection through-hole, so as to define an airflow channel communicating the liquid-injection through-hole with the gas chamber, thereby increasing the number of gas channels for collecting gas to the gas chamber.

With reference to the first aspect, in a possible implementation of the present disclosure, the first separate member and the second separate member are symmetrical with respect to a first symmetry plane. The first symmetry plane is perpendicular to the second direction.

The first separate member has the same structure as the second separate member, thereby improving the compatibility rate of the parts. When the end cover assembly is assembled, there is no need to distinguish and recognize the first separate member and the second separate member, thereby facilitating the assembly of the end cover assembly.

With reference to the first aspect, in a possible implementation of the present disclosure, the first separate member is of a symmetrical structure with respect to the second symmetry plane. The second separate member is of a symmetrical structure with respect to a second symmetry plane. The second symmetry plane is perpendicular to the third direction.

When the end cover assembly is assembled, the first separate member is spaced apart from the second separate member in the second direction, so that there is no need to distinguish and recognize ends of the first separate member in the third direction. There is no need to distinguish and recognize ends of the second separate member in the third direction, thereby further facilitating the assembly of the end cover assembly.

With reference to the first aspect, in a possible implementation of the present disclosure, the end cover defines a first recess and a second recess at one side of the end cover facing the insulating member. Each of the first recess and the second recess defines a recessed ring at an inner wall of each of the first recess and the second recess. The third separate member is provided with a first protrusion at one side of the third separate member facing the end cover. The first protrusion is provided with a raised ring at an outer wall of the first protrusion. The first protrusion is accommodated in the first recess. The raised ring of the first protrusion is accommodated in the recessed ring of the first recess. The fourth separate member is provided with a second protrusion at one side of the fourth separate member facing the end cover. The second protrusion is provided with a raised ring at an outer wall of the second protrusion. The raised ring of the second protrusion is accommodated in the recessed ring of the second recess. The positive pole penetrates through the first protrusion and the first recess. The negative pole penetrates through the second protrusion and the second recess.

Since each raised ring is accommodated in a corresponding recessed ring, it is beneficial to improve the sealing performance between the end cover and the insulating member, thereby improving the reliability of the end cover assembly.

In a second aspect, an energy-storage apparatus is further provided in embodiments of the present disclosure. The energy-storage apparatus includes an end cover assembly and an electrode assembly. The end cover assembly includes an end cover, an insulating member, a positive pole, a negative pole, a first connecting member, a second connecting member, an explosion-proof valve, and an explosion-proof-valve support. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member. The fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction. The third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

The accommodating portion of the first separate member and the accommodating portion of the second separate member define a first gap in communication with the gas chamber in the second direction. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between a surface of each raised edge away from the end cover and the surface of the end cover facing the insulating member is a second height. The first height is less than the second height. A second gap is defined between each raised edge and a corresponding accommodating portion. The second gap is in communication with the gas chamber.

The electrode assembly includes a first electrode-tab and a second electrode-tab. The first electrode-tab partially accommodated in the first accommodating space of the end cover assembly and is connected to the first connecting member of the end cover assembly. The second electrode-tab is partially accommodated in the second accommodating space of the end cover assembly and is connected to the second connecting member of the end cover assembly.

The first electrode-tab is connected to the first connecting member by means of welding, and the second electrode-tab is connected to the second connecting member by means of welding. One end of the first electrode-tab away from the electrode assembly is a welding end, and one end of the second electrode-tab away from the electrode assembly is a welding end. The end cover assembly may further include a first insulating film and a second insulating film. The first connecting member, the first insulating film, and the welding end of the first electrode-tab are all accommodated in the first accommodating space. The second connecting member, the second insulating film, and the welding end of the second electrode-tab are all accommodated in the second accommodating space. Therefore, the insulating members, the end cover, and the housing form all-round insulation-isolation-protection, which can effectively avoid the risk of short circuit caused by the first electrode-tab and the second electrode-tab drifting to the explosion-proof-valve support due to fatigue failure when the energy-storage apparatus is subjected to unexpected impact or is used for a long time.

The first connecting member, the first insulating film, and the welding end of the first electrode-tab are all accommodated in the first accommodating space. The second connecting member, the second insulating film, and the welding end of the second electrode-tab are all accommodated in the second accommodating space. Therefore, the possibility of the first insulating film and the second insulating film respectively drifting out of the first accommodating space and the second accommodating space due to loss of adhesion and peeling off, moving to the gas chamber under the explosion-proof valve, blocking the explosion-proof valve, and causing the explosion-proof valve to fail can be effectively reduced, thus improving the safety performance of the energy-storage apparatus.

In a third aspect, an electricity-consumption device is further provided in embodiments of the present disclosure. The electricity-consumption device includes an energy-storage apparatus. The energy-storage apparatus includes an end cover assembly and an electrode assembly. The end cover assembly includes an end cover, an insulating member, a positive pole, a negative pole, a first connecting member, a second connecting member, an explosion-proof valve, and an explosion-proof-valve support. The insulating member includes a first separate member, a second separate member, a third separate member, and a fourth separate member. The first separate member is spaced apart from the second separate member in a second direction different from the first direction. The first separate member and the second separate member each are provided with an accommodating portion. The third separate member is connected between the first separate member and the second separate member. The fourth separate member is connected between the first separate member and the second separate member. The fourth separate member and the third separate member are arranged in a third direction. Each accommodating portion is between the third separate member and the fourth separate member. The third separate member, the first separate member, and the second separate member cooperatively define a first accommodating space. The fourth separate member, the first separate member, and the second separate member cooperatively define a second accommodating space. The third direction is different from the first direction. The third direction is different from the second direction. The positive pole penetrates through the third separate member and the end cover. The negative pole penetrates through the fourth separate member and the end cover. The first connecting member is accommodated in the first accommodating space and is connected to the positive pole. The second connecting member is accommodated in the second accommodating space and is connected to the negative pole. The explosion-proof-valve support is a metal member. The explosion-proof-valve support is accommodated in the accommodating portion of the first separate member and the accommodating portion of the second separate member. A gas chamber is defined between the explosion-proof-valve support and the explosion-proof valve.

In the second direction, the accommodating portion of the first separate member and the accommodating portion of the second separate member define a first gap in communication with the gas chamber. The third separate member is provided with a raised edge extending in the second direction on a surface of the third separate member away from the end cover. The fourth separate member is provided with a raised edge extending in the second direction on a surface of the fourth separate member away from the end cover. The raised edge of the third separate member is at one end of the third separate member close to the fourth separate member. The raised edge of the fourth separate member is at one end of the fourth separate member close to the third separate member.

A height between a surface of the end cover facing the insulating member and a surface of an end of each accommodating portion away from the explosion-proof-valve support facing the end cover is a first height.

A height between a surface of each raised edge away from the end cover and the surface of the end cover facing the insulating member is a second height. The first height is less than the second height. A second gap is defined between each raised edge and a corresponding accommodating portion. The second gap is in communication with the gas chamber.

The electrode assembly includes a first electrode-tab and a second electrode-tab. The first electrode-tab partially accommodated in the first accommodating space of the end cover assembly and is connected to the first connecting member of the end cover assembly. The second electrode-tab is partially accommodated in the second accommodating space of the end cover assembly and is connected to the second connecting member of the end cover assembly.

Referring to FIG. 1, an electricity-consumption device 1000 is provided in an implementation of the present disclosure. The electricity-consumption device 1000 may include an energy-storage apparatus 100 and a load 200. The energy-storage apparatus 100 is configured to supply power to the load 200. The electricity-consumption device 1000 may include, but is not limited to, a vehicle, an energy-storage system, and an electronic product (for example, a mobile phone, a laptop computer, a tablet computer, and the like). It will be appreciated that the load 200 may be omitted.

Figure 2:
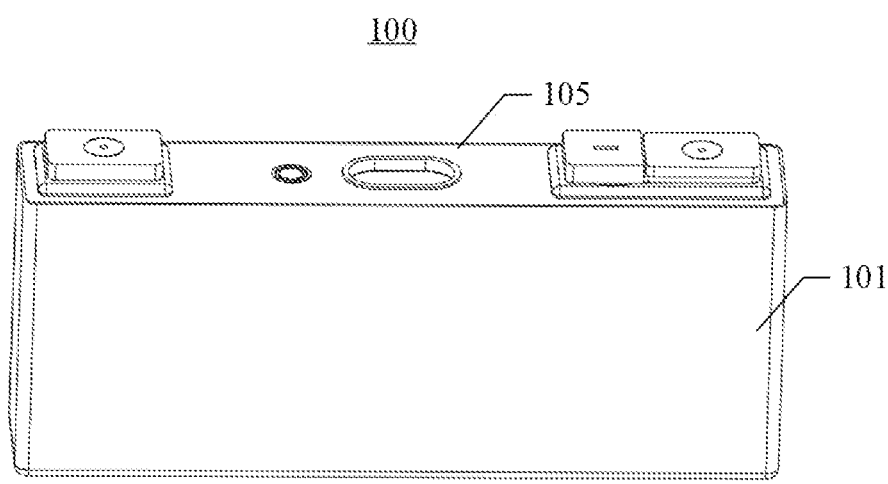
FIG. 2 is a schematic perspective assembly view of an energy-storage apparatus according to an embodiment of the present disclosure.
Figure 3:
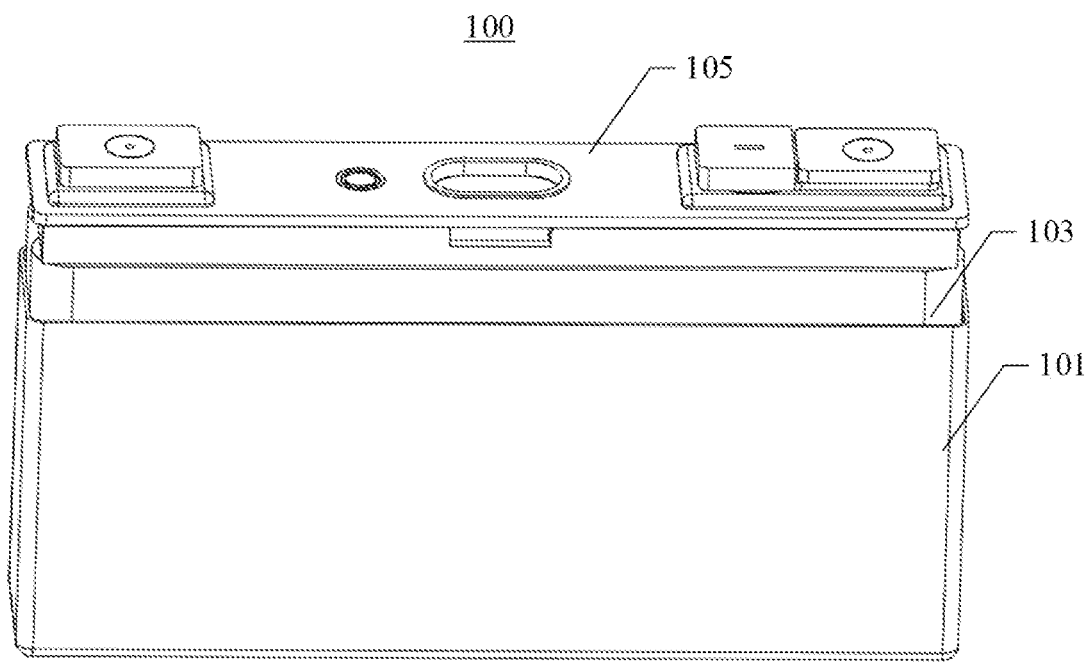
FIG. 3 is a partial exploded view of the energy-storage apparatus shown in FIG. 2.

Referring to FIG. 2 and FIG. 3, the energy-storage apparatus 100 provided in an implementation of the present disclosure may include a housing 101, an electrode assembly 103, and an end cover assembly 105. The electrode assembly 103 may be accommodated in the housing 101. The housing 101 is configured to protect the electrode assembly 103. The housing 101 may be a housing made of aluminum. It can be understood that the present disclosure does not limit the material of the housing 101.

Figure 4:
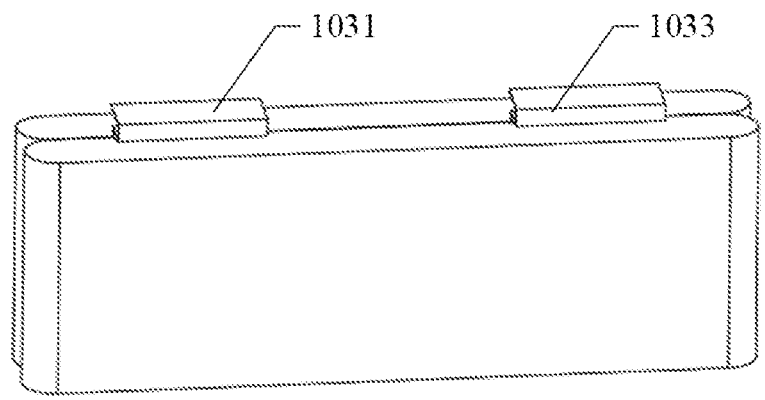
FIG. 4 is a schematic perspective view of an electrode assembly of an energy-storage apparatus.

Referring to FIG. 4, the electrode assembly 103 includes a first electrode-tab 1031 and a second electrode-tab 1033. There is an electrolyte in the electrode assembly 103. The first electrode-tab 1031 is connected to the end cover assembly 105, and the second electrode-tab 1033 is connected to the end cover assembly 105. In this implementation, the first electrode-tab 1031 may be a positive-electrode tab, and the second electrode-tab 1033 may be a negative-electrode tab. In some implementations of the present disclosure, the first electrode-tab 1031 may be a negative-electrode tab, and the second electrode-tab 1033 may be a positive-electrode tab. The electrode assembly 103 is coated with an insulating film, so that the electrode assembly 103 is insulated from the outside.

Figure 5:
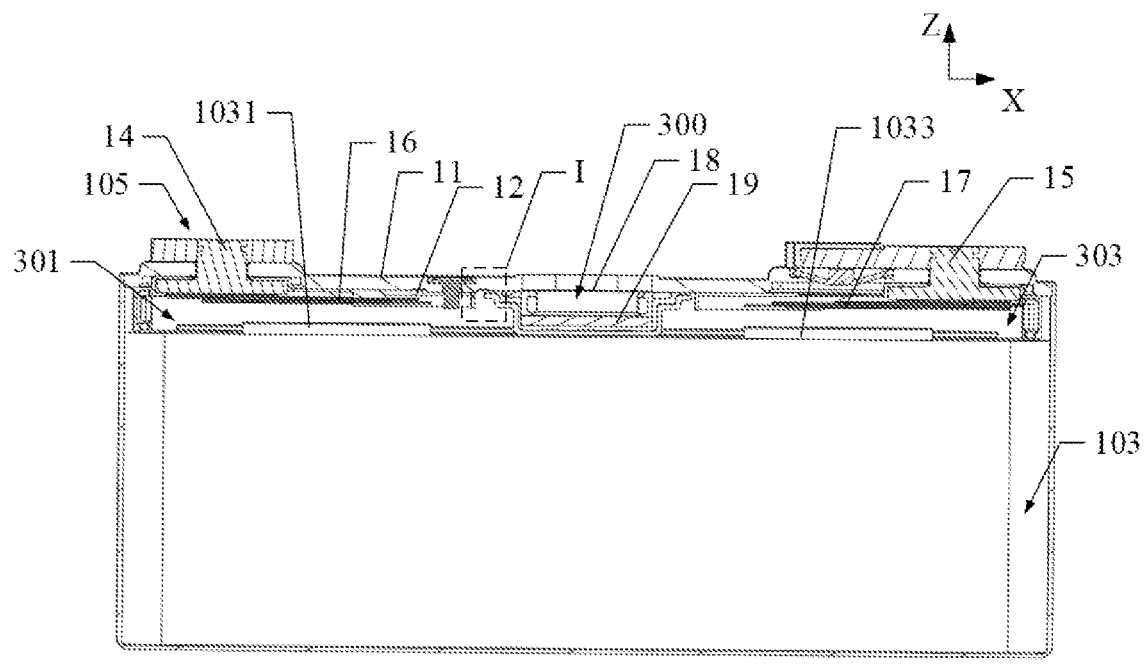
FIG. 5 is a sectional view of the energy-storage apparatus shown in FIG. 2.
Figure 6:
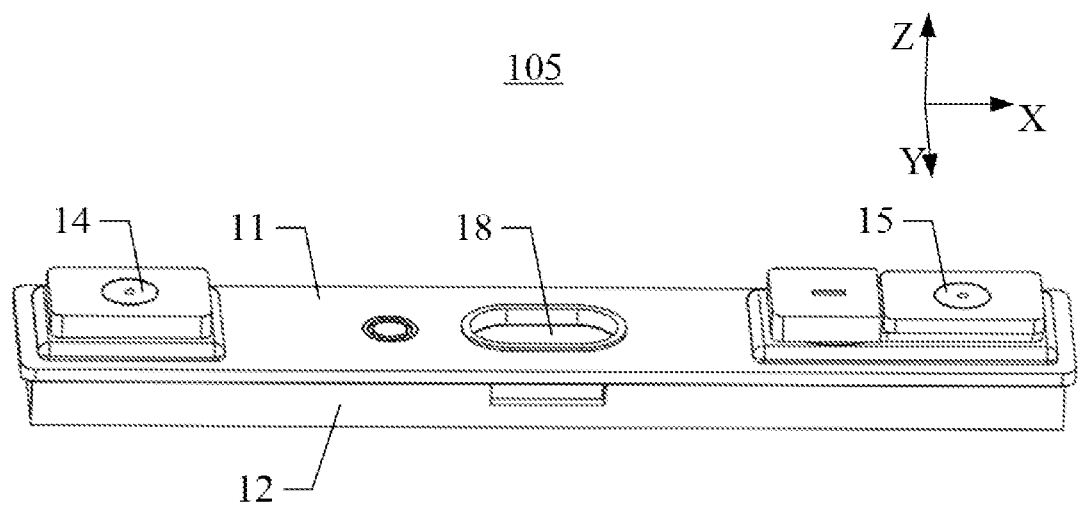
FIG. 6 is a schematic perspective view of an end cover assembly of the energy-storage apparatus shown in FIG. 2.
Figure 7:
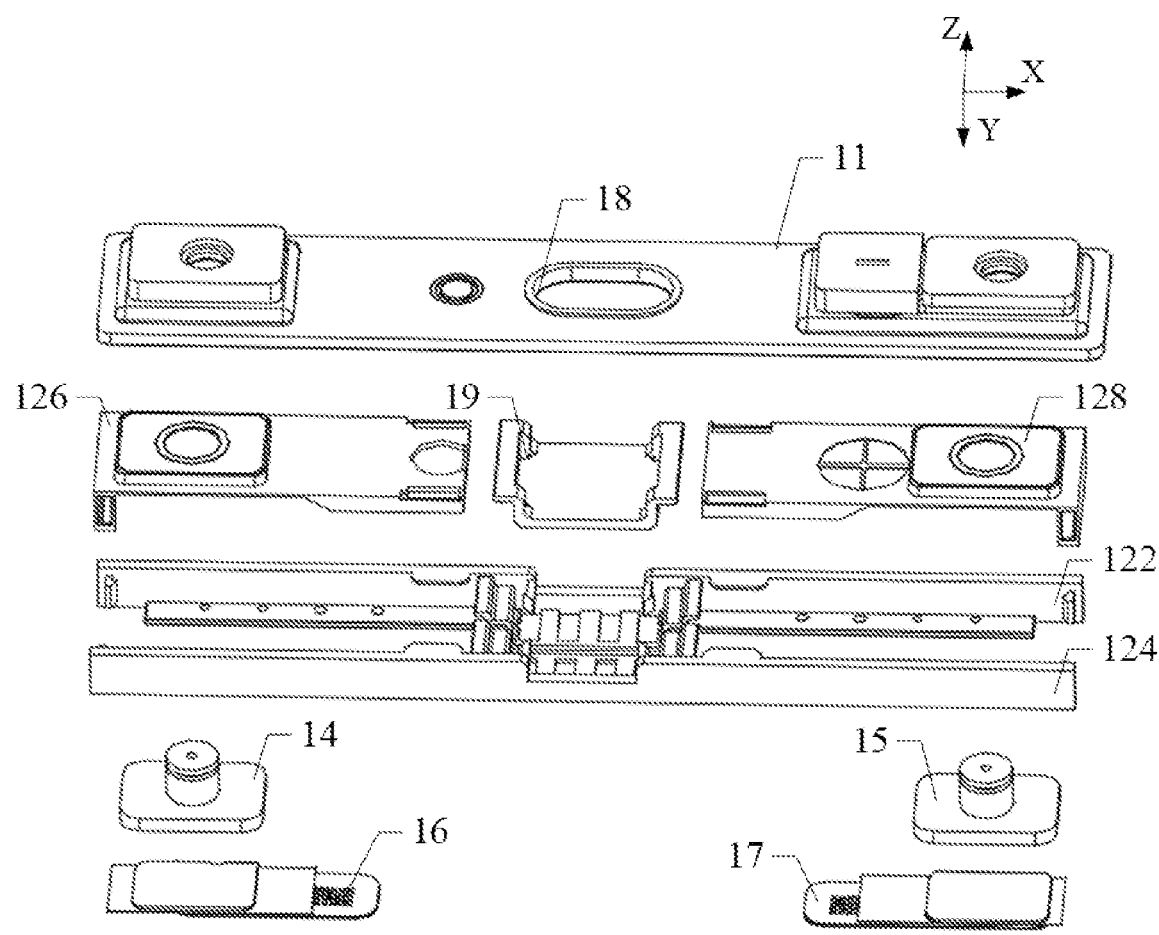
FIG. 7 is an exploded schematic perspective view of the end cover assembly shown in FIG. 6.

Referring to FIG. 5, FIG. 6, and FIG. 7, the end cover assembly 105 includes an end cover 11, an insulating member 12, a positive pole 14, a negative pole 15, a first connecting member 16, a second connecting member 17, an explosion-proof valve 18, and an explosion-proof-valve support 19. The insulating member 12 and the end cover 11 are stacked in a first direction. The insulating member 12 is between the end cover 11 and the electrode assembly 103, so that the end cover 11 is insulated and isolated from the first electrode-tab 1031, and the end cover 11 is insulated and isolated from the second electrode-tab 1033. The end cover 11 is fixedly connected to the housing 101, so that the electrode assembly 103 is isolated from an external environment of the housing 101. The positive pole 14 and the negative pole 15 each penetrate through the insulating member 12 and the end cover 11. The positive pole 14 is connected to the first electrode-tab 1031 to draw out a current. The negative pole 15 is connected to the second electrode-tab 1033 to draw out a current. The first connecting member 16 and the second connecting member 17 are both on the insulating member 12. The first connecting member 16 is connected to the positive pole 14, and the first connecting member 16 is connected to the first electrode-tab 1031, so that the positive pole 14 is connected to the first electrode-tab 1031. The second connecting member 17 is connected to the second electrode-tab 1033, and the second connecting member 17 is connected to the negative pole 15, so that the negative pole 15 is connected to the second electrode-tab 1033.

The explosion-proof valve 18 is disposed on the end cover 11, and is configured to timely open when the internal pressure of the electrode assembly 103 is too large to exhaust and relieve the pressure, so as to reduce the risk of explosion. The explosion-proof-valve support 19 is disposed at one side of the insulating member 12 facing the end cover 11, so that a gas chamber 300 for air circulation is defined between the explosion-proof-valve support 19 and the explosion-proof valve 18. The explosion-proof-valve support 19 is a metal member. The explosion-proof-valve support 19 is the metal member with stronger structural strength than a plastic piece, so as to prevent a false trigger caused by a direct impact of an electrolyte flowing upwards on the explosion-proof valve 18 when a battery falls.

The end cover assembly 105 can further include a resistance member sleeved on the positive pole 14, a resistance member sleeved on the negative pole 15, a pressing block, and other components, which are not further described herein to save space.

In this implementation, the end cover 11 and the housing 101 are welded together by using a laser. It can be understood that the present disclosure does not limit a connection manner between the end cover 11 and the housing 101.

Figure 8:
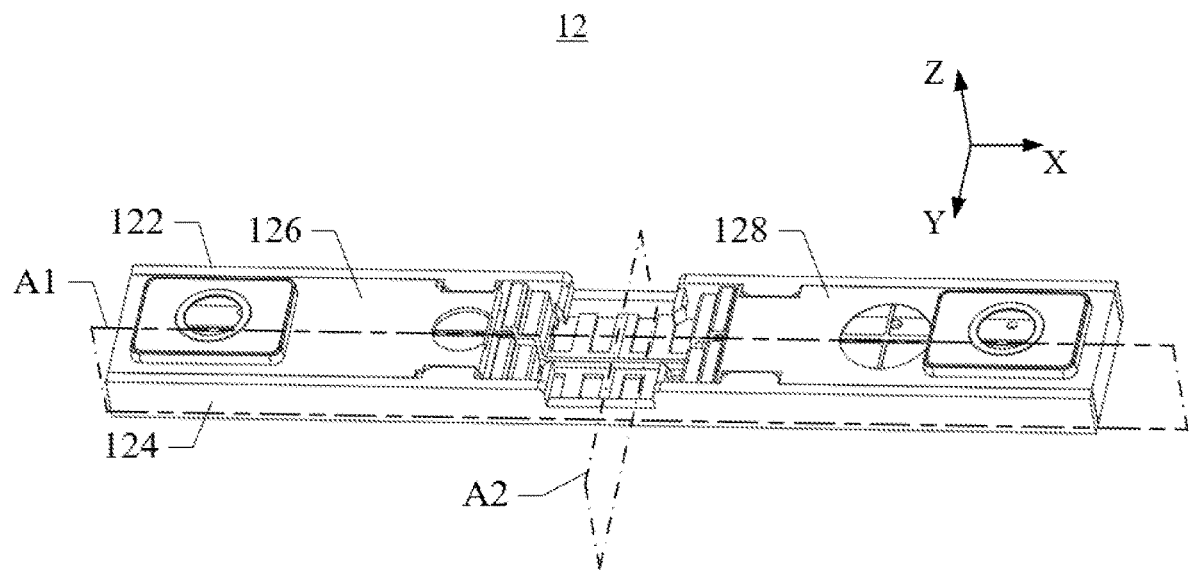
FIG. 8 is a schematic perspective view of an insulating member of an end cover assembly.
Figure 9:
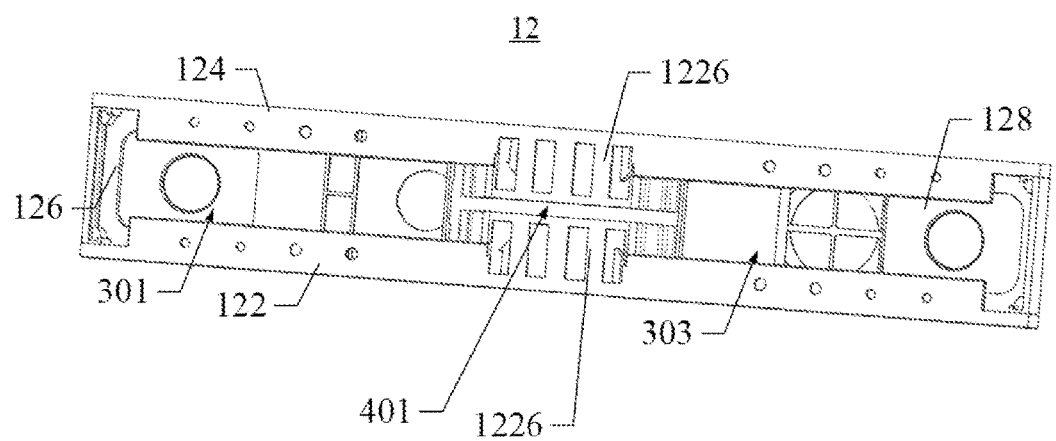
FIG. 9 is a schematic diagram of an insulating member from another view angle.

In this implementation, referring to FIG. 7, FIG. 8, and FIG. 9, the insulating member 12 includes a first separate member 122, a second separate member 124, a third separate member 126, and a fourth separate member 128. The first separate member 122 is spaced apart from the second separate member 124 in a second direction different from the first direction. In the second direction, the third separate member 126 is between the first separate member 122 and the second separate member 124, the third separate member 126 is connected to the first separate member 122 and the second separate member 124 to cooperatively define a first accommodating space 301 for accommodating the first connecting member 16, the insulating film, and the first electrode-tab 1031. In the second direction, the fourth separate member 128 is between the first separate member 122 and the second separate member 124. The third separate member 126 and the fourth separate member 128 are arranged in the third direction, the fourth separate member 128 is connected to the first separate member 122 and the second separate member 124 to cooperatively define a second accommodating space 303 for accommodating the second combining member 17, the insulating film, and the second electrode-tab 1033. The third direction is different from the first direction, and the third direction is different from the second direction. In this implementation, the first direction may be a Z-axis direction, the second direction may be a Y-axis direction, and the third direction may be an X-axis direction.

The positive pole 114 penetrates through the third separate member 126 and the end cover 11. The negative poles 115 penetrates through the fourth separate member 128 and the end cover 11. The first connecting member 16 is accommodated in the first accommodating space 301 and is connected to the positive pole 14, and the second connecting member 17 is accommodated in the second accommodating space 303 and is connected to the negative pole 15. One end of the first electrode-tab 1031 away from the electrode assembly 103 is accommodated in the first accommodating space 301 and is connected to the first connecting member 16. One end of the second electrode-tab 1033 away from the electrode assembly 103 is accommodated in the second accommodating space 303 and is connected to the second connecting member 17.

The insulating member 12 may be made of plastic or other insulating materials. The insulating member 12 is divided into the first separate member 122, the second separate member 124, the third separate member 126, and the fourth separate member 128, that is, the insulating member 12 is of a separated structure. Compared with the integrated insulating member, the manufacturing difficulty of the separate member 12 is more difficult, the first separate member 122, the second separate member 124, the third separate member 126, and the fourth separate member 128 may have larger thicknesses in the first direction, and the thicknesses of the respective parts of the respective separate members may be more uniform, thereby enhancing the strength of the separate member 12 and improving the reliability of the end cover assembly 105.

In this implementation, the first electrode-tab 1031 is connected to the first connecting member 16 by means of welding, and the second electrode-tab 1033 is connected to the second connecting member 17 by means of welding. One end of the first electrode-tab 1031 away from the electrode assembly 103 is a welding end, and one end of the second electrode-tab 1033 away from the electrode assembly 103 is a welding end. The first connecting member 16, a first insulating film, and the welding end of the first electrode-tab 1031 are all accommodated in the first accommodating space 301, and the second connecting member 17, a second insulating film, and the welding end of the second electrode-tab 1033 are all accommodated in the second accommodating space 303, so that the insulation films, the end cover 11, and the housing 101 form all-round insulation-isolation-protection, which can effectively avoid the risk of short circuit caused by the first electrode-tab 1031 and the second electrode-tab 1033 drifting to the explosion-proof-valve support 19 due to fatigue failure when the energy-storage apparatus 100 is subjected to unexpected impact or is used for a long time.

In addition, the first connecting member 16, the first insulating film, and the welding end of the first electrode-tab 1031 are all accommodated in the first accommodating space 301, and the second connecting member 17, the second insulating film, and the welding end of the second electrode-tab 1033 are all accommodated in the second accommodating space 303, so that the possibility of the insulating films respectively drifting out of the first accommodating space 301 and the second accommodating space 303, moving to the gas chamber 300 under the explosion-proof valve 18, blocking the explosion-proof valve 18, and causing the explosion-proof valve 18 to fail can be effectively reduced, thus improving the safety performance of the energy-storage apparatus 100.

In this implementation, as shown in FIG. 8, the first separate member 122 and the second separate member 124 are symmetrical with respect to a first symmetry plane A1, the first symmetry plane A1 is parallel to the third direction, and the first symmetry plane A1 is perpendicular to the second direction. In other words, the first separate member 122 has the same structure as the second separate member 124, so that when the end cover assembly 105 is assembled, there is no need to distinguish and recognize the first separate member 122 and the second separate member 124, thereby facilitating the assembly of the end cover assembly 105.

In this implementation, as shown in FIG. 8, the first separate member 122 is symmetrical with respect to a second symmetry plane A2, and the second separate member 124 is symmetrical with respect to the second symmetry plane A2. The second symmetry plane A2 and the third symmetry plane A3 each are parallel to the first direction. The second symmetry plane A2 and the third symmetry plane A3 each are perpendicular to the third direction. The first symmetry plane A1 is perpendicular to the second symmetry plane A2. The first separate member 122 itself has a symmetrical structure, and the second separate member 124 itself has a symmetrical structure. Since the first separate member 122 has a symmetrical structure with respect to the second symmetry plane A2, and the second separate member 124 is a symmetrical structure with respect to the second symmetry plane A2, when the end cover assembly 105 is assembled, the first separate member 122 is spaced apart from the second separate member 124 in the second direction, so that there is no need to distinguish and recognize ends of the first separate member 122 in the third direction, and there is no need to distinguish ends of the second separate member 124 in the third direction, thereby further facilitating the assembly of the end cover assembly 105.

It can be understood that the present disclosure does not limit that the first separate member 122 and the second separate member 124 are symmetrical with respect to the first symmetry plane A1, and the present disclosure does not limit that the first separate member 122 is symmetrical with respect to the second symmetry plane A2, and the second separate member 124 is symmetrical with respect to the second symmetry plane A2.

Figure 10:
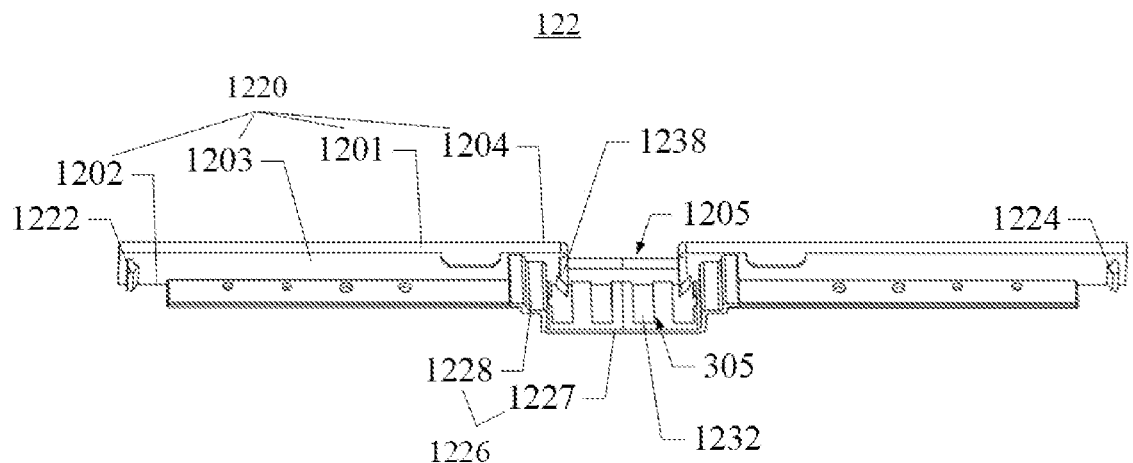
FIG. 10 is a schematic perspective view of a first separate member.
Figure 11:
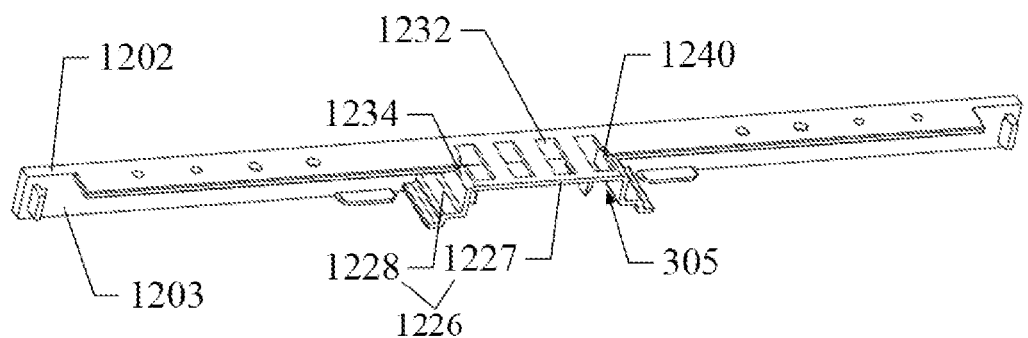
FIG. 11 is a schematic perspective view of a first separate member from another view angle.
Figure 12:
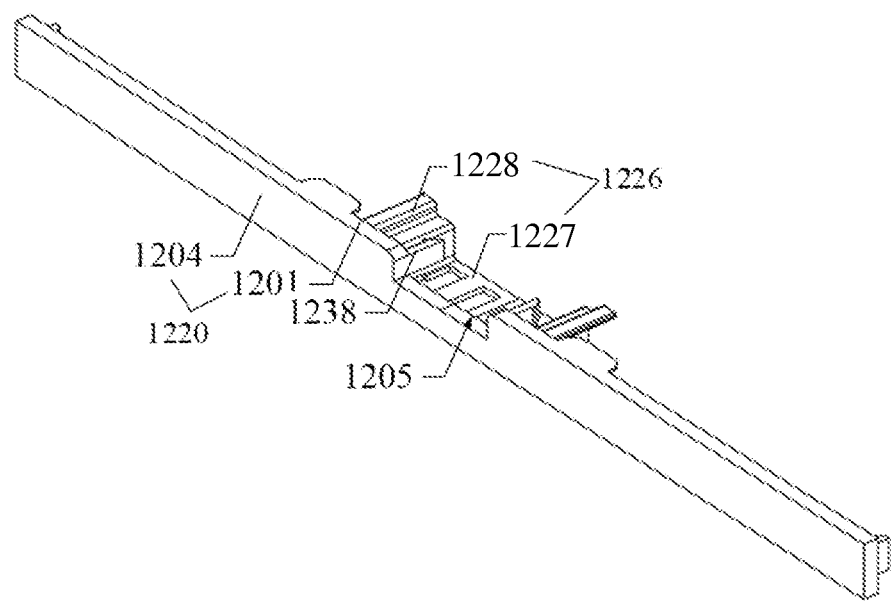
FIG. 12 is a schematic perspective view of a first separate member from yet another view angle.

Referring to FIG. 10, FIG. 11, and FIG. 12, since the first separate member 122 has the same structure as the second separate member 124, FIG. 10 takes the first separate member 122 as an example, and the first separate member 122 and the second separate member 124 each include a substrate 1220, a first hook 1222, and a second hook 1224.

The substrate 1220 has a first surface 1201, a second surface 1202, a third surface 1203, and a fourth surface 1204. The first surface 1201 is opposite to the second surface 1202 in the first direction, and the third surface 1203 is opposite to the fourth surface 1204 in the second direction. The first surface 1201 faces the end cover 11, and the third surface 1203 faces the third separate member 126. The first hook 1222 and the second hook 1224 both protrude from the third surface 1203, that is, the first hook 1222 and the second hook 1224 both protrude from a side of the substrate 1220 facing the third separate member 126. The first hook 1222 is for snap-fit connection with the third separate member 126, and the second hook 1224 is for snap-fit connection with the fourth separate member 128.

The first separate member 122 and the second separate member 124 both further include an accommodating portion 1226 for guiding air. In this implementation, the accommodating portion 1226 is roughly U-shaped. The accommodating portion 1226 is between the first hook 1222 and the second hook 1224. The accommodating portion 1226 of the first separate member 122 is spaced apart from the accommodating portion 1226 of the second separate member 124 in the second direction. The explosion-proof-valve support 19 is accommodated in the accommodating portion 1226 of the first separate member 122 and the accommodating portion 1226 of the second separate member 124. The gas chamber 300 is defined between the explosion-proof-valve support 19 and the explosion-proof valve 18.

Figure 13:
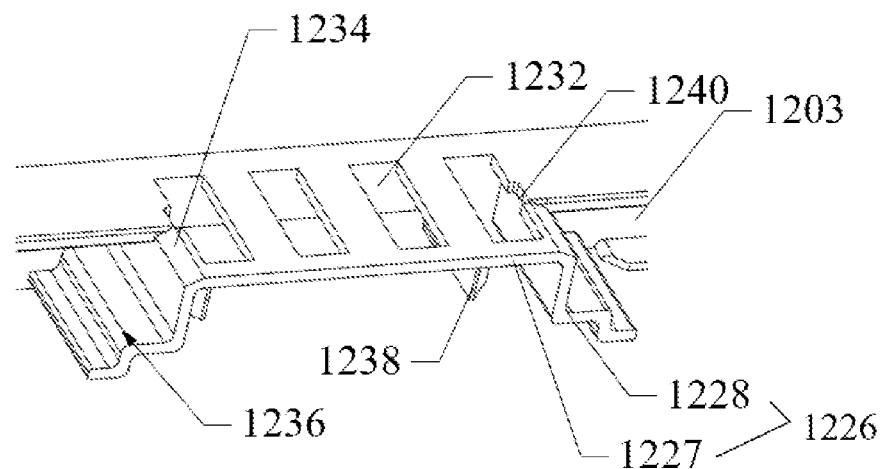
FIG. 13 is a partial enlarged view of the first separate member shown in FIG. 11.

Referring to FIG. 13, the accommodating portion 1226 includes an accommodating bottom wall 1227 and an accommodating side wall 1228. The accommodating bottom wall 1227 and the accommodating side wall 1228 each protrude from one side of the substrate 1220 facing the third separate member 126. The accommodating bottom wall 1227 and the accommodating side wall 1228 cooperatively define an accommodating space 305 for accommodating the explosion-proof-valve support 19. The accommodating bottom wall 1227 defines multiple vent through-holes 1232. In this implementation, the multiple vent through-holes 1232 are arranged in the third direction. The vent through-holes 1232 are used to circulate air. When the internal pressure of the electrode assembly 103 is excessive, the pressure may be relived through the vent through-holes 1232. In this implementation, a small gap is maintained between the accommodating bottom wall 1227 and the explosion-proof-valve support 19 to reduce the fence breakage between the adjacent and spaced vent through-holes 1232 during vibration of the energy-storage apparatus 100.

The accommodating side wall 1228 has a guide slope 1234 for guiding air at one side of the accommodating side wall 1228 away from the accommodating space 305. Air may enter the accommodating space 305 along the guide slope 1234 via a surface of the accommodating portion 1226 away from the accommodating space 305. In this way, the number of airflow channels of the first electrode-tab 1031, the second electrode-tab 1033, and the gas chamber 300 are increased. In this implementation, the guide slope 1234 is formed at a joint of the accommodating side wall 1228 and the accommodating bottom wall 1227. The accommodating side wall 1228 includes at least one step 1236 at one side of the accommodating side wall 1228 away from the accommodating space 305, and the guide slope 1234 may also be disposed at a corner of the at least one step 1236. The guide slope 1234 may be an inclined flat-surface or an inclined curved-surface oblique relative to the accommodating bottom wall 1227. It can be understood that the present disclosure does not limit a structure of the accommodating portion 1226. For example, the accommodating side wall 1228 may not include the at least one step 1236, and the accommodating side wall 1228 has a planar structure.

The first separate member 122 and the second separate member 124 each further include a buckle 1238 for snap-fitted into the explosion-proof-valve support 19. The buckle 1238 protrudes from the substrate 1220 in the second direction and is located in the accommodating space 305. The buckle 1238 is configured to limit a position of the first separate member 122 with respect to the explosion-proof-valve support 19 and a position of the second separate member 124 with respect to the explosion-proof-valve support 19, thereby reducing the possibility that each of middle part of the first separate member 122 in a long strip shape and middle part of the second separate member 124 in a long strip shape from being bent and broken downwards under the action of gravity.

An orthographic projection of the buckle 1238 on a plane where the accommodating bottom wall 1227 is located is in a region where an outermost vent through-hole 1232 in the multiple the present through-holes 1232 which is close to the accommodating side wall 1228 is located. During assembly, with the aid of the vent through-hole 1232 corresponding to the buckle 1238, it is convenient for an operator to align and insert the buckle 1238 into the explosion-proof-valve support 19 and to observe whether the buckle 1238 is mounted in place.

A first indentation 1240 is defined at a side wall of the outermost vent through-hole 1232 in the multiple vent through-holes 1232 which is close to the accommodating side wall 1228, and is for circulating air.

The first separate member 122 defines a notch 1205 on a surface of the first separate member 122 close to the end cover 11, the second separate member 124 defines a notch 1205 on a surface of the second separate member 124 close to the end cover 11, and each notch 1205 is in communication with the corresponding accommodating space 305 in the second direction. The buckle 1238 is disposed along an edge of the notch 1205. The notch 1205 is used to facilitate an operator to observe whether the buckle 1238 is snap-fitted in place. In addition, the notch 1205 may be defined at a side portion of the insulating member 12, so that an airway to the accommodating space 305 is defined.

In this implementation, a rounded-chamfer structure is formed at a joint between an inner wall of the notch 1205 and the first surface 1201. The rounded-chamfer structure can prevent the possibility of scratching the first electrode-tab 1031 and/or the second electrode-tab 1033 due to a sharp corner of the notch during assembly, thereby improving the product yield and reducing the cost of the energy-storage apparatus 100.

It can be understood that the present disclosure does not limit that the joint between the inner wall of the notch 1205 and the first surface 1201 forms the rounded-chamfer structure, and the joint between the inner wall of the notch 1205 and the first surface 1201 may also be a right-angle structure, etc.

It can be understood that the specific structure of the first separate member 122 and the specific structure of the second separate member 124 are not limited in the present disclosure.

Figure 14:
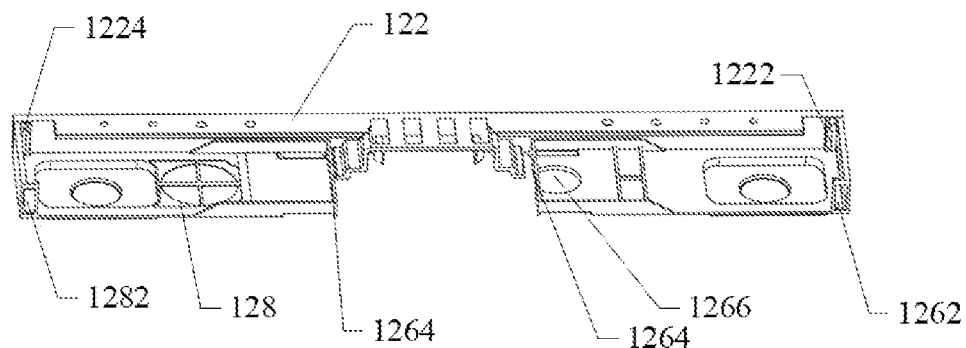
FIG. 14 is a schematic perspective assembly view of an insulating member without a second substrate member.

Referring to FIG. 14, one end of the third separate member 126 away from the fourth separate member 128 defines a first slot 1262. The first hook 1222 is snap-fitted into the first slot 1262. One end of the fourth separate member 128 away from the third separate member 126 defines a second slot 1282. The second hook 1224 is snap-fitted into the second slot 1282.

The first separate member 122 is connected to the third separate member 126 by means of snap-in connection. The first separate member 122 is connected to the fourth separate member 128 by means of snap-in connection. The second separate member 124 is connected to the third separate member 126 by means of snap-in connection. The second separate member 124 is connected to the fourth separate member 128 by means of snap-in connection. Therefore, the connection reliability is improved, and the assembly and disassembly of the end cover assembly 105 is facilitated.

It can be understood that the present disclosure does not limit the connection manner between the first separate member 122 and the third separate member 126 to a manner of the snap-in connection. The connection manner between the first separate member 122 and the third separate member 126 may also be other manners, such as screw connection, adhesive bonding, etc.

It can be understood that the present disclosure does not limit the connection manner between the first separate member 122 and the fourth separate member 128 to a manner of the snap-in connection. The connection manner between the first separate member 122 and the fourth separate member 128 may also be other manners, such as screw connection, adhesive bonding, etc.

It can be understood that the present disclosure does not limit the connection manner between the second separate member 124 and the third separate member 126 to a manner of the snap-in connection. The connection manner between the second separate member 124 and the third separate member 126 may also be other manners, such as screw connection, adhesive bonding, etc.

It can be understood that the present disclosure does not limit the connection manner between the second separate member 124 and the fourth separate member 128 to a manner of the snap-in connection. The connection manner between the second separate member 124 and the fourth separate member 128 may also be other manners, such as screw connection, adhesive bonding, etc.

Figure 15:
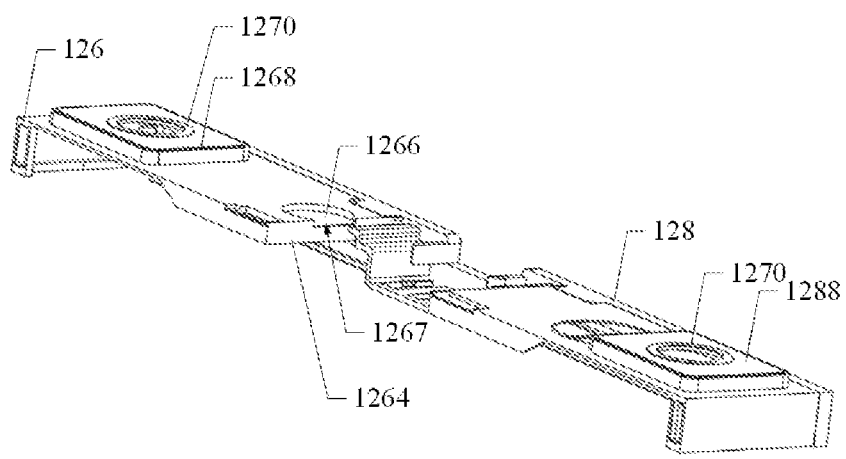
FIG. 15 is a schematic perspective assembly view of an insulating member without a second separate member from another view angle.

Referring to FIG. 14 and FIG. 15, the third separate member 126 is provided with a raised edge 1264 extending in the second direction on a surface of the third separate member 126 away from the end cover 11. The raised edge 1264 of the third separate member 126 is at an edge of one end of the third separate member 126 close to the fourth separate member 128. The raised edge 1264 of the third separate member 126 is connected between the substrate 1220 of the first separate member 122 and the substrate 1220 of the second separate member 124. The third separate member 126 defines a liquid-injection through-hole 1266 close to the raised edge 1264 of the third separate member 126. The raised edge 1264 of the third separate member 126 defines a communicating gas port 1267 in communication with the liquid-injection through-hole 1266, so as to define an airflow channel communicating the liquid-injection through-hole 1266 with the gas chamber 300, thereby increasing the number of channels for collecting gas to the gas chamber 300.

The fourth separate member 128 is provided with a raised edge 1264 extending in the second direction on a surface of the fourth separate member 128 away from the end cover 11, the raised edge 1264 of the fourth separate member 128 is at an edge of one end of the fourth separate member 128 close to the third separate member 126, the raised edge 1264 of the fourth separate member 128 is connected between the substrate 1220 of the first separate member 122 and the substrate 1220 of the second separate member 124, and the explosion-proof-valve support 19 is between the raised edge 1264 of the third separate member 126 and the raised edge 1264 of the fourth separate member 128.

Referring to FIG. 9 again, the accommodating portion 1226 of the first separate member 122 is spaced apart from the accommodating portion 1226 of the second separate member 124 in the second direction to define a first gap 401. The first gap 401 can serve as an airway communicating one side of the accommodating portion 1226 away from the end cover 11 with the gas chamber 300.

Figure 16:
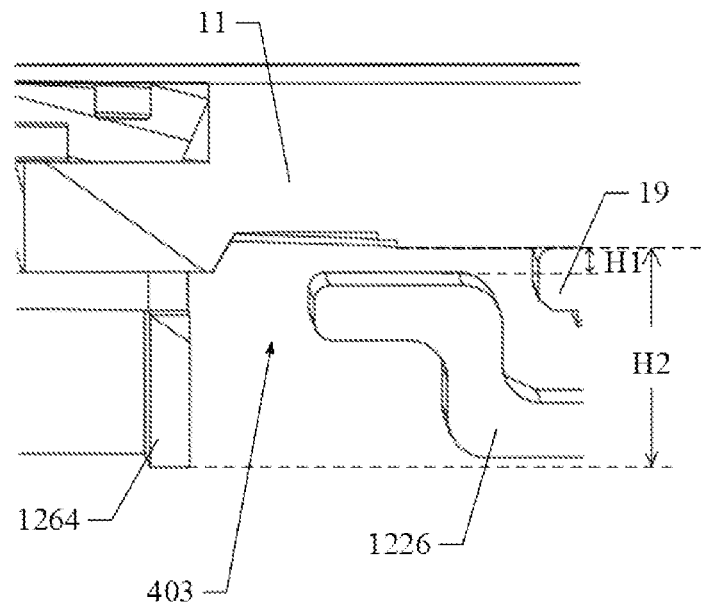
FIG. 16 is an enlarged schematic view of region I of the energy-storage apparatus shown in FIG. 5.

Referring to FIG. 16, for example, a height between a surface of the end cover 11 facing the insulating member 12 and a surface of an end (i.e., an upper-left horizontal part between the second gap 403 and the explosion-proof-valve support 19) of each accommodating portion 1226 away from the explosion-proof-valve support 19 facing the end cover 11 is a first height H1. A height between a surface of each raised edge away from the end cover 11 and the surface of the end cover 11 facing the insulating member 12 is a second height H2, and the first height H1 is less than the second height H2, so that a second gap 403 is defined between each raised edge 1264 and a corresponding accommodating portion 1226. The second gap 403 extends to the explosion-proof-valve support 19. The second gap 403 can be in communication with the gas chamber 300 to define a curved channel.

The explosion-proof-valve support is a metal member. The explosion-proof-valve support exceeds the surface of the end cover facing the electrode assembly. After the energy-storage apparatus is used for a period of time, the first electrode-tab and/or the second electrode-tab may be broken due to aging or unexpected impact. The welding end of the first electrode-tab and the welding end of the second electrode-tab each include a welding fixing region, and the welding fixing region is fixed to the end cover assembly by means of welding, such that even if the welding fixing region of the first electrode-tab and the welding fixing region of the second electrode-tab are broken, the welding fixing region of the first electrode-tab and/or the welding fixing region of the second electrode-tab is not enough to be lap jointed with the explosion-proof-valve support due to the length of the welding fixing region of the first electrode-tab and/or the welding fixing region of the second electrode-tab. However, edges of the first electrode-tab and/or the second electrode-tab located at two sides of the welding fixing region may be broken, and relatively elongated electrode-tab fragments broken are likely to be lap-jointed with the explosion-proof-valve support, so that the positive/negative pole forms an electrical connection with the end cover to be short-circuited, thereby causing thermal runaway of the energy-storage apparatus, resulting in potential safety hazards, and reducing the safety performance of the energy-storage apparatus.

In the present disclosure, the first height H1 is less than the second height H2, and the second gap 403 is defined between each raised edge 1264 and the corresponding accommodating portion 1226. The second gap 403 extends to the explosion-proof-valve support 19, and the curved channel is defined by the second gap 403 being in communication with the gas chamber 300, thereby increasing the number of inlet airways of the energy-storage apparatus 100 that can enter the gas chamber 300.

Figure 17:
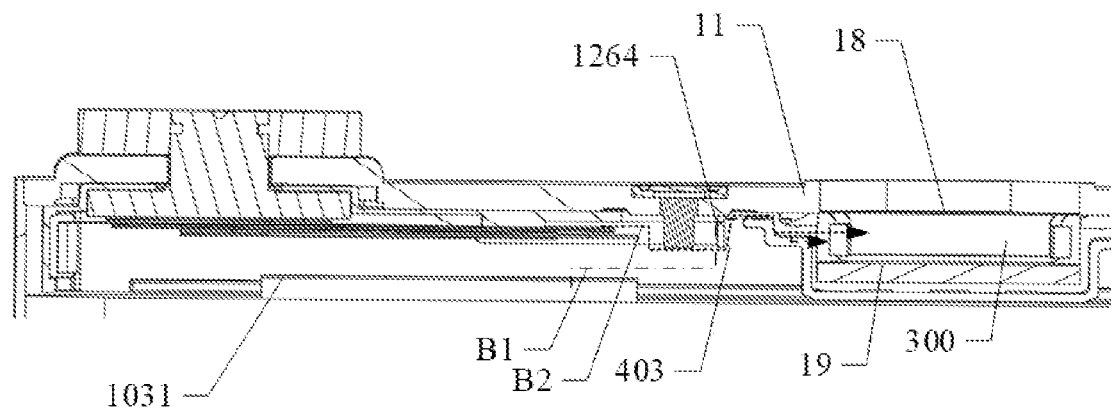
FIG. 17 is a schematic diagram of two possible drift paths for hypothetical electrode-tab fragments.

Even if the electrode tab (the first electrode-tab 1031 or the second electrode-tab 1033) is broken, a distance of the electrode tab (the first electrode-tab 1031 or the second electrode-tab 1033) extending into the explosion-proof-valve support 19 can be lengthened due to the curved channel after the electrode tab is broken. As shown in FIG. 17, a dashed line indicated by B1 and a dashed line indicated by B2 are two possible drift paths of an exemplary drifting electrode-tab fragments. After the electrode tab is broken, one end of a fragment of the electrode tab is still connected to the electrode tab, and the other end of the fragment of the electrode tab needs to drift along a path of a broken line to be lap-jointed with the explosion-proof-valve support. The lap-joint path is greatly lengthened due to the curved channel, thereby reducing the risk of short circuit. In addition, the drifting electrode tab mostly gets stuck at a bending position of the curved channel, and is difficult to abut against the explosion-proof-valve support 19 made of metal after being bent twice, so that the probability that the electrode tab fragments are lap jointed with the explosion-proof-valve support 19 are greatly reduced, the risk of thermal runaway of the energy-storage apparatus 100 is reduced, and the safety and reliability of the energy-storage apparatus 100 are improved.

In this implementation, a ratio of the second height H2 to the first height H1 is in a range of 1.9-4.8. The ratio of the second height H2 to the first height H1 is not limited in the present disclosure.

In this implementation, the first height H1 is in a range of 0.15 mm-1.45 mm, and for example, the first height H1 may be 0.7 mm or the like. The value of the first height H1 is not limited in the present disclosure.

In this implementation, the second height H2 is in a range of 2.2 mm-4.6 mm, and for example, the second height H2 may be 2.74 mm or the like. The value of the second height H2 is not limited in the present disclosure.

Since the third separate member 126 is provided with the raised edge 1264, and the fourth separate member 128 is provided with the raised edge 1264, when the first separate member 122 and the second separate member 124 exchange positions, the first separate member 122 and the second separate member 124 can still be assembled with the third separate member 126 and the fourth separate member 128 respectively, thereby reducing the requirements for the assembly accuracy of the end cover assembly 105, and facilitating the assembly of the end cover assembly 105.

In this implementation, referring to FIG. 15 again, the third separate member 126 is further provided with a first protrusion 1268 at one side of the third separate member 126 facing the end cover 11, and the first protrusion 1268 is configured to mount the positive pole 14 and be matched with and be connected to the end cover 11. An outer wall of the first protrusion 1268 is provided with a raised ring 1270. The fourth separate member 128 is further provided with a second protrusion 1288 at one side of the fourth separate member 128 facing the end cover 11, and the second protrusion 1288 is configured to mount the negative pole 15 and be matched with and be connected to the end cover 11.

Figure 18:
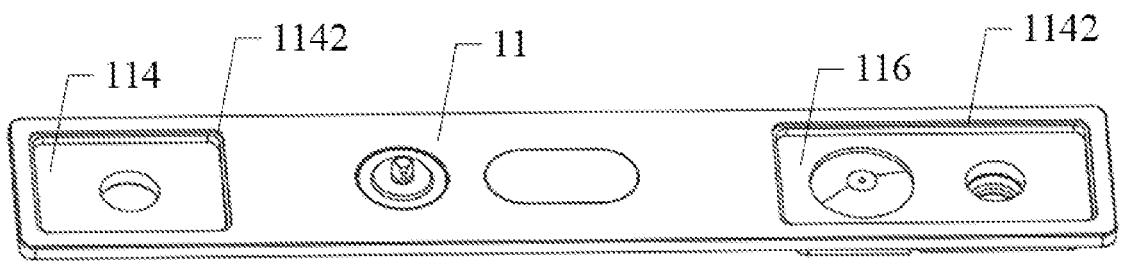
FIG. 18 is a schematic perspective view of an end cover.

An outer wall of the second protrusion 1288 is provided with a raised ring 1270. Referring to FIG. 18, the end cover 11 defines a first recess 114 and a second recess 116 at one surface of the end cover 11 facing the insulating member 12, and the first recess 114 and the second recess 116 each are recessed in a direction away from the insulating member 12. An inner wall of each of the first recess 114 and the second recess 116 defines a recessed ring 1142. The first protrusion 1268 is accommodated in the first recess 114, and the raised ring 1270 of the first protrusion 1268 is accommodated in the recessed ring 1142 of the first recess 114. The raised ring 1270 of the second protrusion 1288 is accommodated in the recessed ring 1142 of the second recess 116. The positive pole 14 penetrates through the first protrusion 1268 and the first recess 114. The negative pole 15 penetrates through the second protrusion 1288 and the second recess 116.

Since each raised ring 1270 is accommodated in the corresponding recessed ring 1142, it is beneficial to improve the sealing performance between the end cover 11 and the insulating member 12, thereby improving the reliability of the end cover assembly 105.

Figure 19:
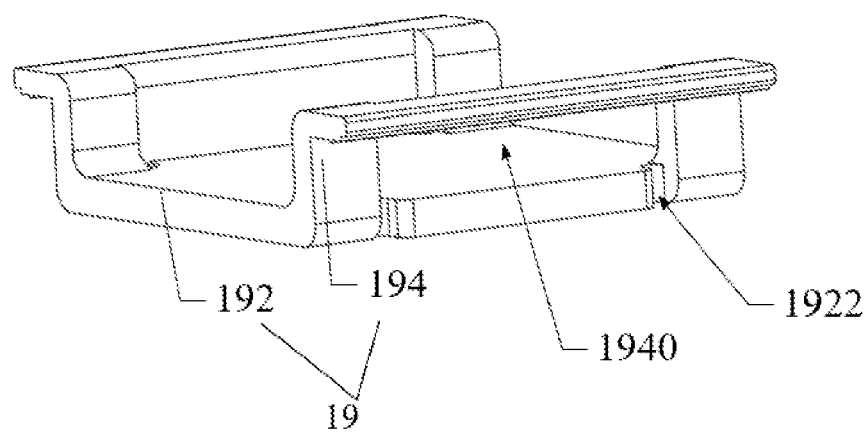
FIG. 19 is a schematic perspective view of an explosion-proof-valve support.
Figure 20:
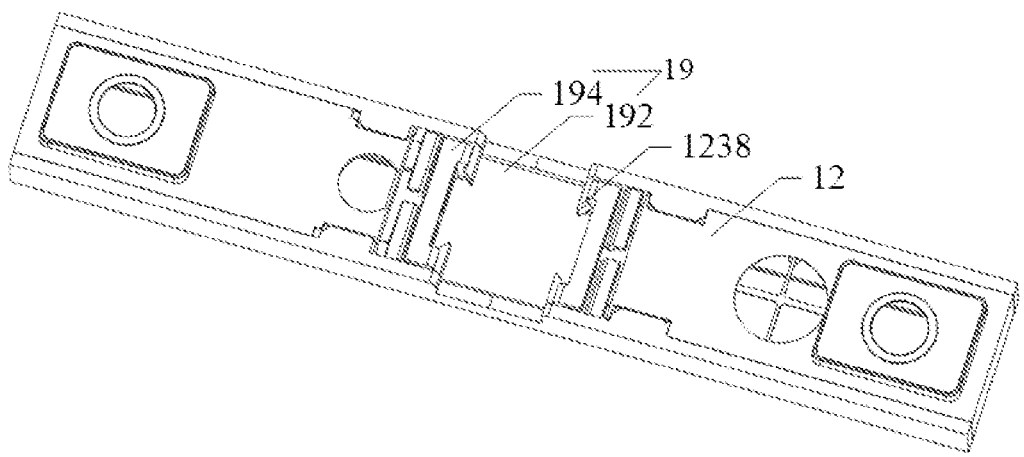
FIG. 20 is a schematic perspective assembly view of an insulating member and an explosion-proof-valve support.
Figure 21:
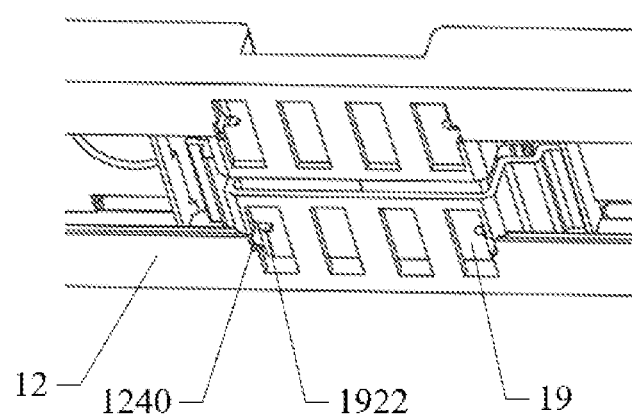
FIG. 21 is a schematic diagram of a partial region of assembly of an insulating member and an explosion-proof-valve support.

Referring to FIG. 19, the explosion-proof-valve support 19 includes a support body 192 and a bending portion 194. The bending portion 194 protrudes from the support body 192 at one side of the support body 192 facing the end cover 11. The gas chamber 300 (as shown in FIG. 5) is defined between the support body 192 and the explosion-proof valve 18. A second indentation 1922 is defined at an edge of the support body 192 close to the bending portion 194. The bending portion 194 defines a hollow region 1940. The hollow region 1940 and the second indentation 1922 each are in communication with the second gap 403, so that the second gap 403 is in communication with the gas chamber 300. Referring to FIG. 20, the buckle 1238 is snap-fitted into the bending portion 194. Referring to FIG. 21, the first indentation 1240 and the second indentation 1922 form a through connection in the first direction, so that a vertical flow channel is defined in the first direction to directly communicate the gas chamber 300 (as shown in FIG. 5) with the electrode assembly 103. In addition, the energy-storage apparatus 100 may shake during transportation or use, the electrolyte in the electrode assembly 103 may flow to the upper surface of the support body 192 facing the end cover 11, and the electrolyte flowing to the upper surface of the support body 192 may flow back along the flow channel defined by the second indentation 1922 and the first indentation 1240 to the middle region of the electrode assembly 103, to perform re-fluid infusion. The gas produced by the electrode assembly 103 may also flow rapidly through the first indentation 1240 and the second indentation 1922 and be collected to the gas chamber 300 under the explosion-proof valve 18.

The above descriptions are some embodiments of the present disclosure, and should not be considered to limit the scope of the claims of the present disclosure, and therefore, equivalent changes made according to the claims of the present disclosure belong to the scope of protection of the present disclosure.

What is claimed is:

1. An end cover assembly, for an energy-storage apparatus, wherein the end cover assembly comprises:
   an end cover;
   an insulating member, wherein the insulating member and the end cover are stacked in a first direction, the insulating member comprises a first separate member, a second separate member, a third separate member, and a fourth separate member, the first separate member is spaced apart from the second separate member in a second direction different from the first direction, and the first separate member and the second separate member each are provided with an accommodating portion; wherein the third separate member is connected between the first separate member and the second separate member, the fourth separate member is connected between the first separate member and the second separate member, the fourth separate member and the third separate member are arranged in a third direction, and each accommodating portion is between the third separate member and the fourth separate member; and the third separate member, the first separate member, and the second separate member cooperatively define a first accommodating space, the fourth separate member, the first separate member, and the second separate member cooperatively define a second accommodating space, the third direction is different from the first direction, and the third direction is different from the second direction;
   a positive pole penetrating through the third separate member and the end cover;
   a negative pole penetrating through the fourth separate member and the end cover;
   a first connecting member accommodated in the first accommodating space and connected to the positive pole;
   a second connecting member accommodated in the second accommodating space and connected to the negative pole;
   an explosion-proof valve disposed on the end cover; and
   an explosion-proof-valve support, wherein the explosion-proof-valve support is a metal member, the explosion-proof-valve support is accommodated in the accommodating portion of the first separate member and the accommodating portion of the second separate member, and a gas chamber is defined between the explosion-proof-valve support and the explosion-proof valve; wherein
   the accommodating portion of the first separate member and the accommodating portion of the second separate member define a first gap in communication with the gas chamber in the second direction,
   the third separate member is provided with a raised edge extending in the second direction on a surface of the third separate member away from the end cover, the fourth separate member is provided with a raised edge extending in the second direction on a surface of the fourth separate member away from the end cover, the raised edge of the third separate member is at one end of the third separate member close to the fourth separate member, and the raised edge of the fourth separate member is at one end of the fourth separate member close to the third separate member,
   a height between a surface of the end cover facing the insulating member and a surface of an end of each accommodating portion away from the explosion-proof-valve support facing the end cover is a first height, and
   a height between a surface of each raised edge away from the end cover and the surface of the end cover facing the insulating member is a second height, and the first height is less than the second height, a second gap is defined between each raised edge and a corresponding accommodating portion, and the second gap is in communication with the gas chamber.

2. The end cover assembly according to claim 1, wherein a ratio of the second height to the first height is in a range of 1.9-4.8.

3. The end cover assembly according to claim 1, wherein the first height is in a range of 0.15 mm-1.45 mm.

4. The end cover assembly according to claim 1, wherein the second height is in a range of 2.2 mm-4.6 mm.

5. The end cover assembly according to claim 1, wherein each accommodating portion comprises an accommodating bottom wall and an accommodating side wall fixedly connected to the accommodating bottom wall, the accommodating bottom wall and the accommodating side wall cooperatively define an accommodating space, the accommodating bottom wall defines a plurality of vent through-holes, and the explosion-proof-valve support is accommodated in the accommodating space of the first separate member and the accommodating space of the second separate member.

6. The end cover assembly according to claim 5, wherein the first separate member and the second separate member each further comprise a buckle, the buckle is in the accommodating space, and the buckle is snap-fitted into the explosion-proof-valve support.

7. The end cover assembly according to claim 6, wherein the plurality of the vent through-holes are arranged in the third direction; and
an orthographic projection of the buckle on a plane where the accommodating bottom wall is located is in a region where an outermost vent through-hole in the plurality of the vent through-holes which is close to the accommodating side wall is located.

8. The end cover assembly according to claim 6, wherein the plurality of the vent through-holes are arranged in the third direction, and a first indentation that is recessed is defined at a side wall of an outermost vent through-hole in the plurality of the vent through-holes which is close to the accommodating side wall; and
the explosion-proof-valve support comprises a support body and a bending portion, the bending portion protrudes from the support body at one side of the support body facing the end cover, the buckle is snap-fitted into the bending portion, a second indentation is defined at an edge of the support body close to the bending portion, and the first indentation is in communication with the second indentation in the first direction.

9. The end cover assembly according to claim 5, wherein the accommodating portion has a guide slope inclined with respect to the third direction at one side of the accommodating portion away from the accommodating space.

10. The end cover assembly according to claim 5, wherein the first separate member defines a notch on a surface of the first separate member close to the end cover, the second separate member defines a notch on a surface of the second separate member close to the end cover, and each notch is in communication with the accommodating space in the second direction.

11. The end cover assembly according to claim 5, wherein the first separate member and the second separate member each further comprise a substrate, a first hook, and a second hook, and the accommodating portion, the first hook, and the second hook all protrude from one side of the substrate facing the third separate member;
the third separate member defines a first slot at one end of the third separate member away from the fourth separate member, and the first hook is snap-fitted into the first slot; and
the fourth separate member defines a second slot at one end of the fourth separate member away from the third separate member, and the second hook is snap-fitted into the second slot.

12. The end cover assembly according to claim 1, wherein the third separate member defines a liquid-injection through-hole close to the raised edge of the third separate member, and the raised edge of the third separate member defines a communicating gas port in communication with the liquid-injection through-hole.

13. The end cover assembly according to claim 1, wherein the first separate member and the second separate member are symmetrical with respect to a first symmetry plane, and the first symmetry plane is perpendicular to the second direction.

14. The end cover assembly according to claim 13, wherein the first separate member is of a symmetrical structure with respect to a second symmetry plane, the second separate member is of a symmetrical structure with respect to the second symmetry plane, and the second symmetry plane is perpendicular to the third direction.

15. The end cover assembly according to claim 1, wherein the end cover defines a first recess and a second recess at one side of the end cover facing the insulating member, and each of the first recess and the second recess defines a recessed ring at an inner wall of each of the first recess and the second recess;
the third separate member is provided with a first protrusion at one side of the third separate member facing the end cover, the first protrusion is provided with a raised ring at an outer wall of the first protrusion, the first protrusion is accommodated in the first recess, and the raised ring of the first protrusion is accommodated in the recessed ring of the first recess;
the fourth separate member is provided with a second protrusion at one side of the fourth separate member facing the end cover, the second protrusion is provided with a raised ring at an outer wall of the second protrusion, and the raised ring of the second protrusion is accommodated in the recessed ring of the second recess;
the positive pole penetrates through the first protrusion and the first recess; and
the negative pole penetrates through the second protrusion and the second recess.

16. An energy-storage apparatus, comprising:
an end cover assembly comprising:
an end cover;
an insulating member, wherein the insulating member and the end cover are stacked in a first direction, the insulating member comprises a first separate member, a second separate member, a third separate member, and a fourth separate member, the first separate member is spaced apart from the second separate member in a second direction different from the first direction, and the first separate member and the second separate member each are provided with an accommodating portion; wherein the third separate member is connected between the first separate member and the second separate member, the fourth separate member is connected between the first separate member and the second separate member, the fourth separate member and the third separate member are arranged in a third direction, and each accommodating portion is between the third separate member and the fourth separate member; and the third separate member, the first separate member, and the second separate member cooperatively define a first accommodating space, the fourth separate member, the first separate member, and the second separate member cooperatively define a second accommodating space, the third direction is different from the first direction, and the third direction is different from the second direction;
a positive pole penetrating through the third separate member and the end cover;
a negative pole penetrating through the fourth separate member and the end cover;
a first connecting member accommodated in the first accommodating space and connected to the positive pole;
a second connecting member accommodated in the second accommodating space and connected to the negative pole;
an explosion-proof valve disposed on the end cover; and
an explosion-proof-valve support, wherein the explosion-proof-valve support is a metal member, the explosion-proof-valve support is accommodated in the accommodating portion of the first separate member and the accommodating portion of the second separate member, and a gas chamber is defined between the explosion-proof-valve support and the explosion-proof valve; wherein
the accommodating portion of the first separate member and the accommodating portion of the second separate member define a first gap in communication with the gas chamber in the second direction,
the third separate member is provided with a raised edge extending in the second direction on a surface of the third separate member away from the end cover, the fourth separate member is provided with a raised edge extending in the second direction on a surface of the fourth separate member away from the end cover, the raised edge of the third separate member is at one end of the third separate member close to the fourth separate member, and the raised edge of the fourth separate member is at one end of the fourth separate member close to the third separate member,
a height between a surface of the end cover facing the insulating member is a first height and a surface of an end of each accommodating portion away from the explosion-proof-valve support facing the end cover, and
a height between a surface of each raised edge away from the end cover and the surface of the end cover facing the insulating member is a second height, and the first height is less than the second height, a second gap is defined between each raised edge and a corresponding accommodating portion, and the second gap is in communication with the gas chamber; and
an electrode assembly, wherein the electrode assembly comprises a first electrode-tab and a second electrode-tab, the first electrode-tab is partially accommodated in the first accommodating space of the end cover assembly and is connected to the first connecting member of the end cover assembly; and the second electrode-tab is partially accommodated in the second accommodating space of the end cover assembly and is connected to the second connecting member of the end cover assembly.

17. The energy-storage apparatus according to claim 16, wherein each accommodating portion comprises an accommodating bottom wall and an accommodating side wall fixedly connected to the accommodating bottom wall, the accommodating bottom wall and the accommodating side wall cooperatively define an accommodating space, the accommodating bottom wall defines a plurality of vent through-holes, and the explosion-proof-valve support is accommodated in the accommodating space of the first separate member and the accommodating space of the second separate member.

18. The energy-storage apparatus according to claim 16, wherein the third separate member defines a liquid-injection through-hole close to the raised edge of the third separate member, and the raised edge of the third separate member defines a communicating gas port in communication with the liquid-injection through-hole.

19. The energy-storage apparatus according to claim 16, wherein the end cover defines a first recess and a second recess at one side of the end cover facing the insulating member, and each of the first recess and the second recess defines a recessed ring at an inner wall of each of the first recess and the second recess;
the third separate member is provided with a first protrusion at one side of the third separate member facing the end cover, the first protrusion is provided with a raised ring at an outer wall of the first protrusion, the first protrusion is accommodated in the first recess, and the raised ring of the first protrusion is accommodated in the recessed ring of the first recess;
the fourth separate member is provided with a second protrusion at one side of the fourth separate member facing the end cover, the second protrusion is provided with a raised ring at an outer wall of the second protrusion, and the raised ring of the second protrusion is accommodated in the recessed ring of the second recess;
the positive pole penetrates through the first protrusion and the first recess; and
the negative pole penetrates through the second protrusion and the second recess.

20. An electricity-consumption device comprising an energy-storage apparatus, wherein the energy-storage apparatus comprises:
an end cover assembly comprising:
an end cover;
an insulating member, wherein the insulating member and the end cover are stacked in a first direction, the insulating member comprises a first separate member, a second separate member, a third separate member, and a fourth separate member, the first separate member is spaced apart from the second separate member in a second direction different from the first direction, and the first separate member and the second separate member each are provided with an accommodating portion; wherein the third separate member is connected between the first separate member and the second separate member, the fourth separate member is connected between the first separate member and the second separate member, the fourth separate member and the third separate member are arranged in a third direction, and each accommodating portion is between the third separate member and the fourth separate member; and the third separate member, the first separate member, and the second separate member cooperatively define a first accommodating space, the fourth separate member, the first separate member, and the second separate member cooperatively define a second accommodating space, the third direction is different from the first direction, and the third direction is different from the second direction;

a positive pole penetrating through the third separate member and the end cover;

a negative pole penetrating through the fourth separate member and the end cover;

a first connecting member accommodated in the first accommodating space and connected to the positive pole;

a second connecting member accommodated in the second accommodating space and connected to the negative pole;

an explosion-proof valve disposed on the end cover; and an explosion-proof-valve support, wherein the explosion-proof-valve support is a metal member, the explosion-proof-valve support is accommodated in the accommodating portion of the first separate member and the accommodating portion of the second separate member, and a gas chamber is defined between the explosion-proof-valve support and the explosion-proof valve; wherein the accommodating portion of the first separate member and the accommodating portion of the second separate member define a first gap in communication with the gas chamber in the second direction, the third separate member is provided with a raised edge extending in the second direction on a surface of the third separate member away from the end cover, the fourth separate member is provided with a raised edge extending in the second direction on a surface of the fourth separate member away from the end cover, the raised edge of the third separate member is at one end of the third separate member close to the fourth separate member, and the raised edge of the fourth separate member is at one end of the fourth separate member close to the third separate member, a height between a surface of the end cover facing the insulating member and a surface of an end of each accommodating portion away from the explosion-proof-valve support facing the end cover is a first height, and a height between a surface of each raised edge away from the end cover and the surface of the end cover facing the insulating member is a second height, and the first height is less than the second height, a second gap is defined between each raised edge and a corresponding accommodating portion, and the second gap is in communication with the gas chamber; and an electrode assembly, wherein the electrode assembly comprises a first electrode-tab and a second electrode-tab, the first electrode-tab is partially accommodated in the first accommodating space of the end cover assembly and is connected to the first connecting member of the end cover assembly; and the second electrode-tab is partially accommodated in the second accommodating space of the end cover assembly and is connected to the second connecting member of the end cover assembly.

* * * * *